United States Patent
Sirois

(10) Patent No.: US 7,038,350 B2
(45) Date of Patent: May 2, 2006

(54) ROTATED REVERSE-DIRECTION-STAPLE SYSTEM AND METHOD

(75) Inventor: Robert D. Sirois, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 10/637,980

(22) Filed: Aug. 8, 2003

(65) Prior Publication Data

US 2004/0032181 A1 Feb. 19, 2004

Related U.S. Application Data

(63) Continuation-in-part of application No. 09/682,277, filed on Aug. 13, 2001, now Pat. No. 6,847,285, and a continuation-in-part of application No. 09/682,269, filed on Aug. 11, 2001, now Pat. No. 6,722,015.

(51) Int. Cl.
*H02K 1/06* (2006.01)

(52) U.S. Cl. .................. 310/217; 310/216; 310/218

(58) Field of Classification Search ......... 310/158–259
See application file for complete search history.

(56) References Cited

U.S. PATENT DOCUMENTS

| | | | | |
|---|---|---|---|---|
| 4,728,842 A | * | 3/1988 | Martin | 310/217 |
| 5,142,178 A | * | 8/1992 | Kloster et al. | 310/217 |
| 5,248,911 A | * | 9/1993 | Joseph | 310/216 |
| 5,894,182 A | * | 4/1999 | Saban et al. | 310/217 |
| 6,722,015 B1 | * | 4/2004 | Sirois et al. | 29/596 |
| 6,747,388 B1 | * | 6/2004 | Takano et al. | 310/217 |
| 6,847,285 B1 | * | 1/2005 | Sirois et al. | 336/234 |
| 2004/0056556 A1 | * | 3/2004 | Fujita | 310/217 |

* cited by examiner

*Primary Examiner*—Thanh Lam
(74) *Attorney, Agent, or Firm*—Ohlandt, Greeley, Ruggiero & Perle, L.L.P.

(57) ABSTRACT

A core for an electric machine having a first lamination plate with a first staple, a second lamination plate with a second staple and a second hole, and a third lamination plate with a third hole and a third opening is provided. The first and second lamination plates are rotated with respect to one another so that the first staple is positioned through the second hole and is bent over the second lamination plate to secure the first and second lamination plates to one another. Similarly, the second and third lamination plates are rotated with respect to one another so that the second staple is positioned through the third hole and is bent over the third lamination plate to secure the second and third lamination plates to one another. In addition, the first staple that is bent over the second lamination plate is received in the third opening.

13 Claims, 5 Drawing Sheets

|  | First lamination | Rotate #1 | Second lamination | Rotate #2 | Third lamination | Rotate #3 | Fourth lamination |
|---|---|---|---|---|---|---|---|
| Hole | 294 | 60 | 354 | 60 | 54 | 60 | 114 |
| Staple | 0 | 60 | 60 | 60 | 120 | 60 | 180 |
| Open | 50 | 60 | 110 | 60 | 170 | 60 | 230 |
| Hole | 119 | 60 | 179 | 60 | 239 | 60 | 299 |
| Staple | 173 | 60 | 233 | 60 | 293 | 60 | 353 |
| Open | 238 | 60 | 298 | 60 | 358 | 60 | 58 |

FIG. 6

ROTATED REVERSE-DIRECTION-STAPLE SYSTEM AND METHOD

CROSS-REFERENCE TO RELATED APPLICATIONS

This application is a continuation-in-part of U.S. application Ser. No. 09/682,269 filed on Aug. 11, 2001 now U.S. Pat. No. 6,722,015 and a continuation-in-part of U.S. application Ser. No. 09/682,277 filed on Aug. 13, 2001 now U.S. Pat. No. 6,847,285, the contents of each of which are incorporated herein by reference.

BACKGROUND OF THE INVENTION

The present disclosure relates to electric machines and more specifically to a rotated reverse-direction-staple system and method for securing lamination plates of an electric machine to one another.

Electric machines, such as motors, generators, alternators, starter-generators, typically have a stator core and/or a rotor core formed of a plurality of stacked lamination plates. The stacked lamination plates are commonly held together along the axial dimension by welding, cleating, or conventional interlocking.

The welding and cleating methods add cost and time to the manufacturing process since these methods are performed after the lamination plates are pressed and stacked.

During conventional interlocking, each lamination plate is stamped so that an indentation is formed on one side of the plate and a protrusion extends from the opposite side of the plate. Typically, the protrusion extends in a downward direction from the lamination plates. The lamination plates are then stacked so that the downward protrusion of a first lamination plate is received in and forms an interference fit with the indentation of a subsequent lamination plate. Thus, conventional interlocked lamination plates can be formed during the pressing and stacking operation and, thus can be less costly than other methods.

However, the conventional interlocked lamination plates can form a core that is "spongy" or breaks apart during subsequent manufacturing operations, which has limited the height of the stack. Additionally, the conventional interlocked lamination plates require extreme accuracy and tolerances in the punching operation, which can add cost and complexity to the manufacturing process. For example, the position of the interlocking protrusion and indentation between the subsequent lamination plates must be very accurate in order to ensure the required interference fit. In addition, the tolerances between the punch and the die require extreme close punch to die clearance (e.g., conventional interlock requires about 0.0002 inches clearance) in order to ensure the required interference fit. Moreover, the position and number of the interlocking protrusion/indentations can cause eddy currents in the electric machine, which reduces the efficiency of the electric machine.

The stacked lamination plates are typically stamped from a piece of stock material. The stock material can have a variation in thickness along its length and/or width, commonly known as gamma. When stacking lamination plates, the gamma can cause the stack to be distorted. Specifically, the resultant stack can be curved with respect to its longitudinal axis when each lamination plate is stacked on top of one another so that its thickness variation is located in the same location (i.e., non-rotated laminations). Thus, it has become common to rotate each lamination with respect to one another so that the gamma is evenly distributed about the longitudinal axis, which results in a straight stack.

Accordingly, there is a continuing need for methods of stamping lamination plates of an electric machine and securing those plates to one another in a straight stack and products formed thereby that eliminate one or more of the aforementioned drawbacks and deficiencies of the conventional methods. Moreover, there is a continuing need for methods of stamping and securing lamination plates to form a tightly secured and straight stack as the lamination plates are being assembled in the stamping process.

SUMMARY OF THE INVENTION

A core for an electric machine is provided. The core includes a first lamination plate, a second lamination plate, and a third lamination plate. The first lamination plate has a first staple extending therefrom, while the second lamination plate has a second staple extending therefrom and a second hole defined therein. The second lamination plate is secured on the first lamination plate by the first staple being received through the second hole and having a first portion bent over the second lamination plate. The third lamination plate has a third hole defined therein and a third opening defined therein. The third lamination plate is secured on the second lamination plate by the second staple being received through the third hole and having a second portion bent over the third lamination plate. In addition, the first portion of the first staple is received in the third opening.

A core for an electric machine having a first lamination plate with a first staple, a second lamination plate with a second staple and a second hole, and a third lamination plate with a third hole and a third opening is also provided. The first and second lamination plates are rotated with respect to one another so that the first staple is positioned through the second hole and is bent over the second lamination plate to secure the first and second lamination plates to one another. Similarly, the second and third lamination plates are rotated with respect to one another so that the second staple is positioned through the third hole and is bent over the third lamination plate to secure the second and third lamination plates to one another and such that the first staple that is bent over the second lamination plate is received in the third opening.

A method of forming a core of an electric machine is also provided. The method includes stamping a blank to form a first lamination having a pair of first staples, a pair of first holes, and a pair of first openings; rotating the first lamination a predetermined distance about an axis defined through the core; stamping the blank to form a second lamination having a pair of second staples, a pair of second holes, and a pair of second openings; stacking the second lamination on the first lamination so that a first portion of the pair of first staples extend through the pair of second holes; and bending the first portion to secure the first and second laminations together.

The above-described and other features and advantages of the present invention will be appreciated and understood by those skilled in the art from the following detailed description, drawings, and appended claims.

BRIEF DESCRIPTION OF THE DRAWINGS

FIG. 6 is a table depicting the location of the staples, holes, and openings of the system of FIG. 5.

DETAILED DESCRIPTION OF THE INVENTION

Figure 1:
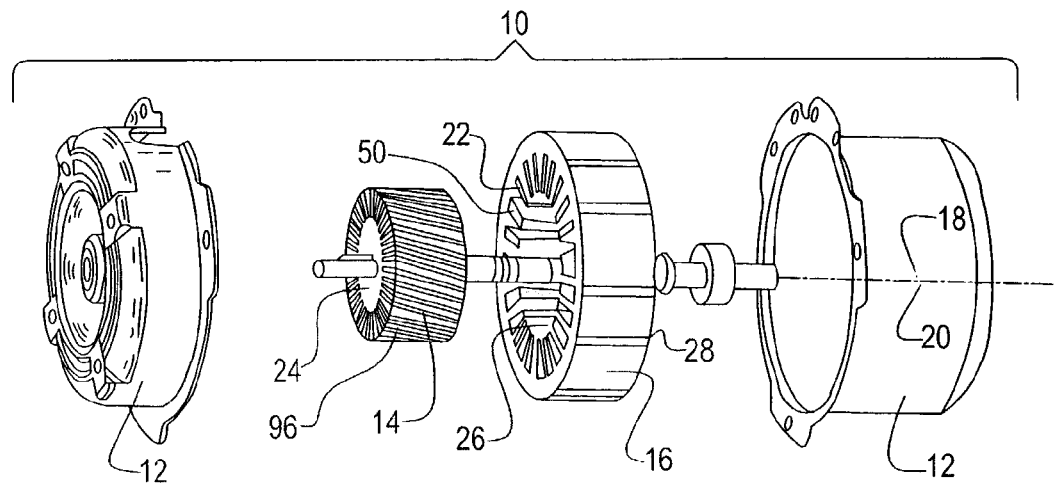
FIG. 1 is an exploded, perspective view of an exemplary electric machine.

Referring to the drawings and in particular to FIG. 1, there is shown an electric machine generally illustrated by reference numeral 10. Electric machine 10 can be a motor, a generator, an alternator, a starter-generator, a motor-generator, and others. It should be recognized that various components of electric machine 10 have been omitted from FIG. 1 for purposes of clarity.

Electric machine 10 can include a housing 12 having a rotor 14 and a stator 16 disposed therein. In the illustrated example, stator 16 is the stationary portion of electric machine 10 that is mounted to and within housing 12. Rotor 14 is the rotating portion of electric machine 10 that is positioned for rotation within stator 16.

Stator 16 defines a first longitudinal axis 18, while rotor 14 defines a second longitudinal axis 20. Rotor 14 is positioned in stator 16 such that the axes 18, 20 of the rotor and the stator are collinear so that an air gap 22 is defined therebetween. Gap 22 permits rotor 14 to freely rotate within stator 16 without the rotor and the stator inadvertently contacting one another. In a typical, small, fractional electric machine, e.g., less than one horsepower, gap 22 can be about ten thousandths of an inch (10 mils).

Rotor 14 includes a rotor core 24 and stator 16 includes a stator core 26. Cores 24, 26 are each formed of a plurality of plates or laminations 28 that are stacked together, one on another.

Figure 3:
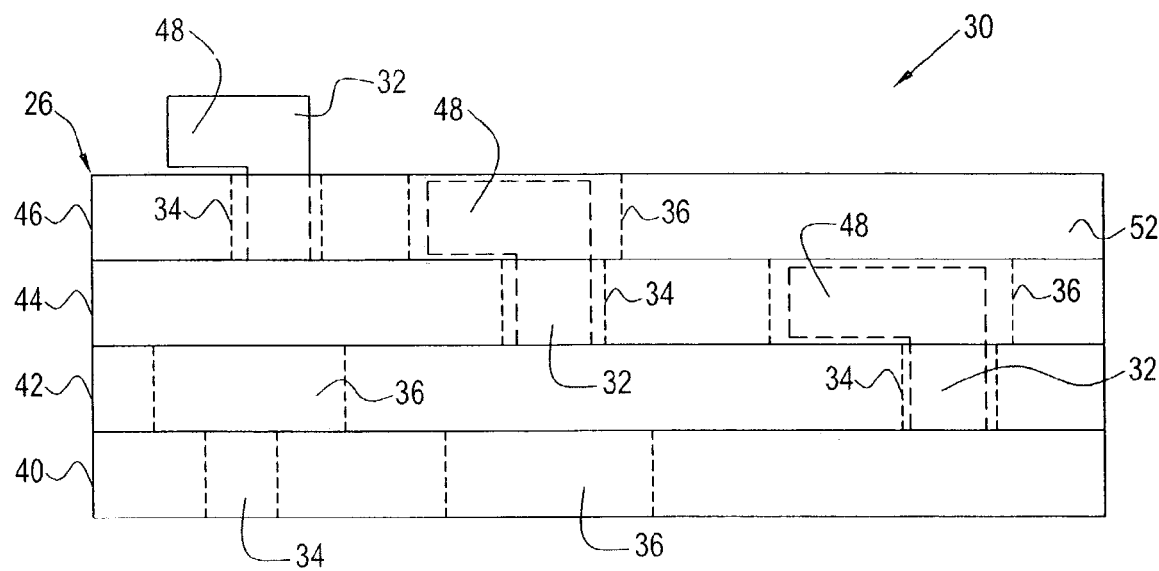
FIG. 3 is a partial side view of an exemplary embodiment a core formed of the lamination of FIG. 2.
Figure 2:
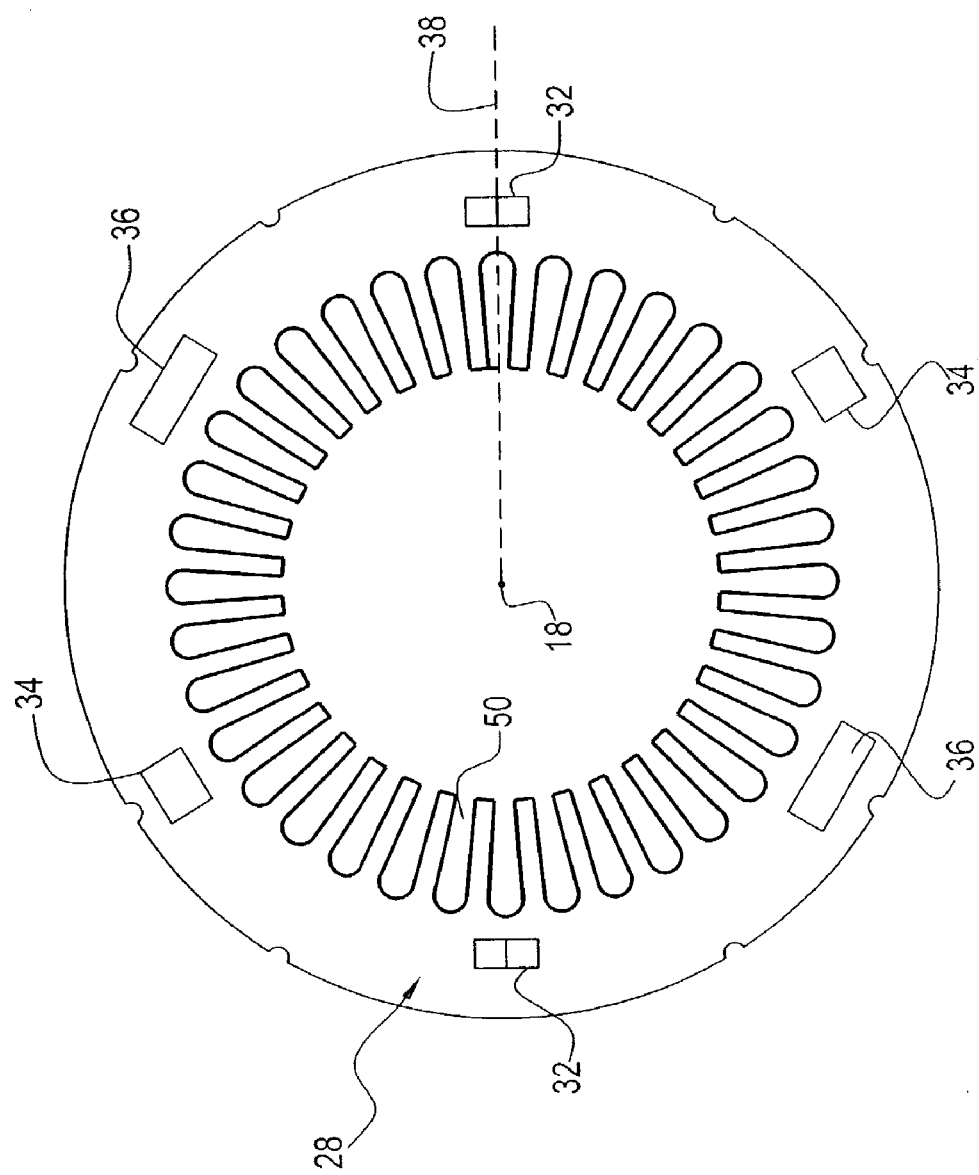
FIG. 2 is a top view of an exemplary embodiment of a stator lamination for a rotated reverse-direction-staple system according to the present disclosure.

Laminations 28 are secured in place relative to one another by a rotated reverse-direction-staple system 30 illustrated in FIGS. 2–3. System 30 can be used to secure laminations 28 of rotor core 24 together as a unitary member and/or can be used to secure laminations 28 of stator core 26 as a unitary member. For purposes of clarity, system 30 is illustrated herein by way of example in use with stator core 26. Of course, it is contemplated by the present disclosure for system 30 to find equal use with rotor cores 24.

Core 26 has number or plurality of laminations 28 stacked on top of one another and rotated with respect to one another. As illustrated in FIG. 2, each lamination 28 includes a pair of staples 32, a pair of staple access holes 34, and a pair of staple clearance openings 36. Staples 32 extend upwards from lamination 28 (i.e., staples 32 are bent vertically upwards from lamination 28). Thus, staples 32 have a reverse direction as compared to the downward protrusions of prior interlocking tabs.

Staples 32 are offset from one another by about one hundred eighty degrees (180°). Similarly, holes 34 are offset from one another by about one hundred eighty degrees (180°) and openings 36 are offset from one another by about one hundred eighty degrees (180°). In addition, each staple 32 is offset from one of the holes 34 and one of the openings 36 by about sixty degrees (60°). Thus, staples 32, holes 34, and openings 36 are evenly distributed from one another about the circumference of lamination 28.

In the embodiment illustrated in FIG. 2, one staple 32 is positioned in lamination 28 at about zero degrees (0°) from a datum line 38, while the other staple 32 is positioned at about one hundred eighty degrees (180°) from the datum line. Here, datum line 38 runs radially outward from the center of lamination 28, namely radially outward from axis 18.

Further, one hole 34 is positioned in lamination 28 at about sixty degrees (60°) from datum line 38, while the other hole 34 is positioned at about two hundred forty degrees (240°) from the datum line. One opening 36 is positioned in lamination 28 at about one hundred twenty, degrees (120°) from datum line 38, while the other opening 36 is positioned at about three hundred degrees (300°) from the datum line.

System 30 is illustrated in FIG. 3 for purposes of clarity having four laminations 28, namely a first lamination 40, a second lamination 42, a third lamination 44, and a fourth lamination 46. Of course, it is contemplated by the present disclosure for system 30 to have more or less than four laminations 28, with a minimum of two laminations being contemplated.

During assembly of stator core 26, second lamination 42 is stacked onto first lamination 40 so that staples 32 of the first lamination are received through holes 34 of the second lamination. Namely, first and second laminations 40, 42 are rotated with respect to one another about axis 18 by about sixty degrees (60°). Accordingly, any gamma or thickness variation present in first and second laminations 40, 42, respectively, is rotated with respect to one another. Once rotated and stacked, a portion 48 of each staple 32 of first lamination 40 extends through and above second lamination 42. Portion 48 is then bent over second lamination 42 to secure the first and second laminations to one another.

Next, third lamination 44 is stacked onto second lamination 42 so that staples 32 of the second lamination are received through holes 34 of the third lamination. Again, any gamma present in second and third laminations 42, 44, respectively, is rotated with respect to one another. Portion 48 of each staple 32 of second lamination 42 is then bent over third lamination 44 to secure the second and third laminations to one another. In addition, third lamination 44 is stacked onto second lamination 42 so that the bent portion 48 of staples 32 of first lamination 40 are received in openings 36 of the third lamination. Openings 36 allow the second and third laminations 42, 44 to be stacked onto one another so that their surfaces are in substantial contact with each other without interference from portion 48 of staple 32 of first lamination 40.

Fourth lamination 46 is then stacked onto third lamination 44 so that staples 32 of the third lamination are received through holes 34 of the fourth lamination. Again, any gamma present in third and fourth laminations 44, 46, respectively, is rotated with respect to one another. Portion 48 of each staple 32 of third lamination 44 is then bent over fourth lamination 46 to secure the third and fourth laminations to one another. In addition, fourth lamination 46 is stacked onto third lamination 44 so that the bent portion 48 of staples 32 of second lamination, 40 are received in openings 36 of the fourth lamination.

In this embodiment, system 30 provides stator core 26 with laminations 28 where the lamination's winding slots 50 are axially aligned with one another as seen in FIG. 1. Specifically, system 30 includes staples 32, holes 34, and openings 36 that are evenly distributed from one another, which ensures that slots 50 are axially aligned with one another as seen in FIG. 1.

In an alternate embodiment also shown in FIG. 3, system 30 can include a termination lamination 52 of stack 26. Here, termination lamination 52 does not include staples 32. Rather, termination lamination 52 includes only holes 34 and openings 36. Termination lamination 52 allows a second stator core 26 (not shown) to be stacked immediately upon the termination lamination during manufacture without being secured thereto by staples.

Thus, system 30 provides for laminations 28 to be rotated about sixty degrees (60°) with respect to one another and to be stacked onto each other. In this manner, staples 32 in previous laminations 28 are received by holes 34 in subsequent laminations so that the lower surface of the subsequent lamination is in contact with the upper surface of the prior lamination. In some embodiments, the termination lamination 52 of system 30 includes staple access holes 34 and staple clearance openings 36, but lacks the reverse-direction-staples 32. Thus, termination lamination 52 is configured to not be attachable to any subsequent lamination and, thus, does not require staples 32.

It has been found that by alternating the position of the staples 32, holes 34, and openings 36 from lamination 28 to lamination 28 ensures that the laminations can be tightly secured to one another without interference caused by the bent staple portion 48. Rotated reverse-direction-staple system 30 has staples 32 with a height sufficient to extend through the holes 34 in the immediately subsequent lamination 28. In addition, system 30 includes holes 34 with a size sufficient to receive the upstanding staple of the previous lamination 28, but limited in shape and/or size to prevent the portion 48 of staple 32, once bent over, from pulling though the hole and disconnecting the laminations. Further, system 30 includes openings 36 with a size sufficient to receive the portion 48 that is bent over the previous lamination. In this manner, rotated reverse-direction-staple system 30 tightly secures the laminations together to form stator core 26. Further, the rotation of laminations 28 with respect to one another allows stator core 26 to compensate for gamma or variations in the material that is used to form the laminations. Specifically, the rotation of the various laminations with respect to one another distributes or spreads any gamma present in the laminations about stator core 26. Thus, system 30 provides for a straight, with respect to axis 18, stator core 26.

It has also been found that eliminating the staple in the termination lamination allows rotated reverse-direction-staple system 30 to be used to form multiple stator cores directly on top of one another without being connected to each other.

Figure 4:
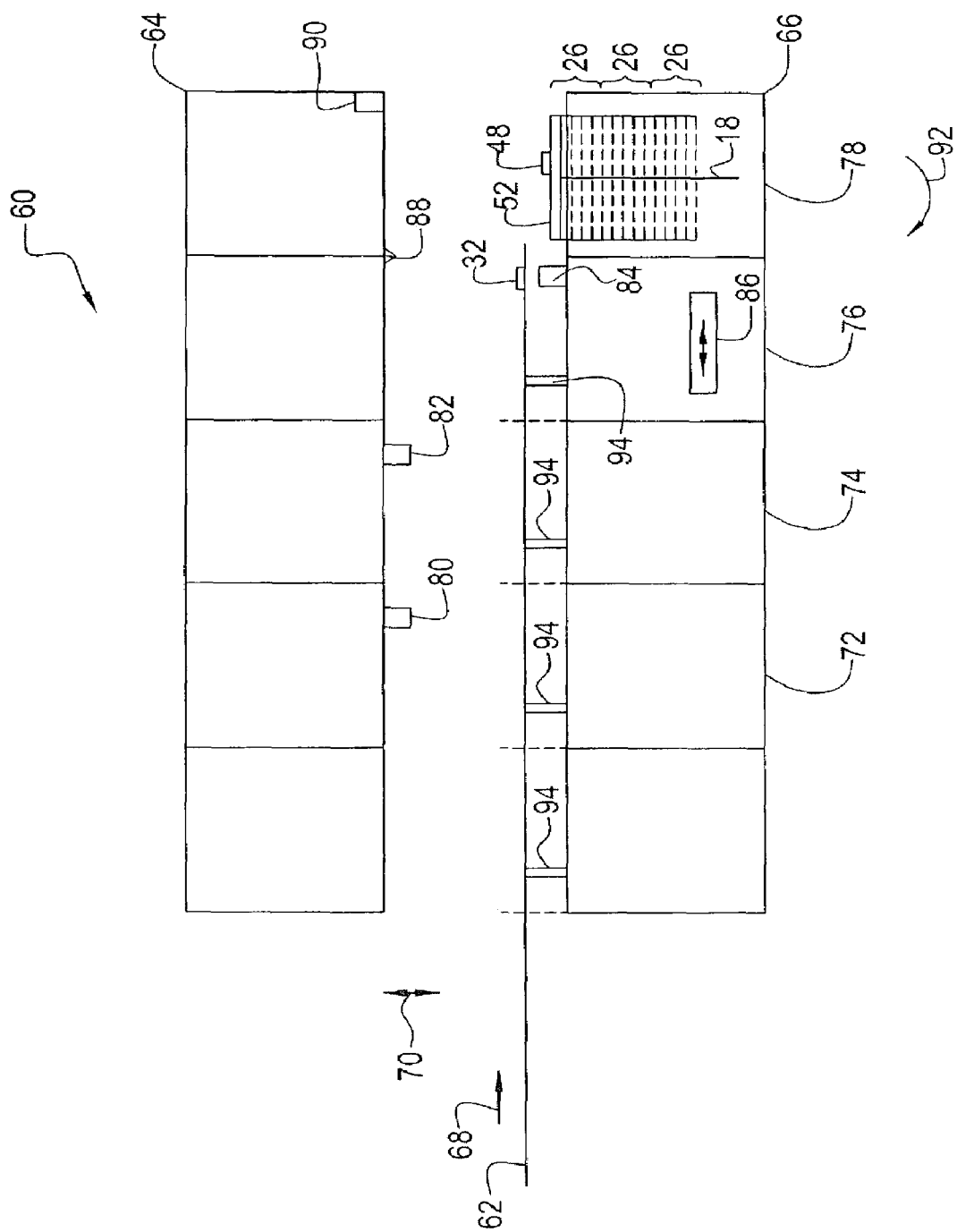
FIG. 4 is a side schematic view of exemplary method of forming a rotated reverse-direction-staple system.

Referring now to FIG. 4, there is shown an exemplary embodiment of a method 60 of manufacturing rotated reverse-direction-staple system 30 is illustrated. Again and for purposes of clarity, method 60 is illustrated by way of example as forming stator core 26 of electric machine 10 having reverse-direction-staple system 30. Of course, it is contemplated by the present disclosure for method 60 to find equal use with the manufacture of rotor core 24 and/or with the simultaneous manufacture rotor and stator cores. It should also be recognized that method 60 omits various aspects of the stamping process for laminations 28 not related to reverse-direction-staple system 30 for purposes of clarity.

Method 60 progressively stamps laminations 28 from a blank 62 to form stator core 26. Namely, method 60 stamps the laminations, stacks these laminations in a rotated manner, and bends the staples to form stator core 26.

Method 60 indexes blank 62 between a press 64 and a die 66 in a first direction 68. In addition, press 64 and/or die 66 are configured to reciprocate with respect to one another in a second direction 70 to stamp laminations 28 from blank 62. Laminations 28 are formed at a number of stations, such as a first station 72, a second station 74, and a third station 76. In addition, stator core 26 is formed from laminations 28 at a fourth or stacking station 78. Method 60 is illustrated in FIG. 4 after press 64 and/or die 66 have been reciprocated in second direction 70 and before blank 62 has been indexed in first direction 68.

In an exemplary embodiment of method 60, first, second, and third stations 72, 74, 76, respectively, each stamps a different feature (e.g., staples, holes, or openings) of reverse-direction-staple system 30. For example, first station 72 can be configured to form openings 36, second station 74 can be configured to form holes 34 and third station 76 can be configured to form staples 36.

First station 72 can have a pair of first punches 80 (only one shown) extending, preferably, from press 64. First punches 80 are sized, positioned, and configured to form the desired openings 36 in laminations 28. Similarly, second station 74 can have a pair of second punches 82 (only one shown) extending, preferably, from press 64. Second punches 82 are sized, positioned, and configured to form the desired holes 34 in laminations 28. Third station 76 is configured to form staples 32 in blank 62. Since staples 32 have a reverse direction (i.e., extend upwards), third station 76 includes a pair of lances 84 (only one shown) extending from die 66.

In an alternate exemplary embodiment, lances 84 are selectively moveable between an extended position and a retracted position (not shown) with respect to die 66. In the extended position, lances 84 form staples 32 in laminations 28. Conversely, lances 84 do not form staples 32 in laminations 28 when in the retracted position. In this manner, third station 76 is configured to form termination lamination 52, as needed.

Method 60 can selectively extend lances 84 from die 66 by any suitable means. For example, lances 84 can be extended by an automatic slide cam 86 in die 66. Cam 86 can be moved to extend or retract lances 84 as required. Of course, lances 84 can be operated by other means such as, but not limited to, pneumatic or hydraulic cylinders.

Fourth or stacking station 78 is configured to severe laminations 28 from blank 62, stack the laminations to form stator core 26, bend the staples to secure the stacked laminations to one another, and rotate the stator core into position to receive the next lamination.

Fourth station 78 can have a blade 88 for severing laminations 28 from blank 62. As press 64 and/or die 66 reciprocate in second direction 70, blade 88 severs lamination 28 from blank 62 and stacks the severed lamination onto core 26 in fourth station 78. Thus, fourth station 78 severs the lamination and stacks or blanks that lamination onto a previous lamination in the station to form stator core 26.

In addition, fourth station 78 bends staples from the previous lamination over the newly inserted lamination to secure the top two laminations together. However, fourth station 78 is further configured to not bend staples located on the top (i.e., most recently inserted) lamination. Thus, fourth station 78 can have a pair of punch inserts 90 (only one shown) positioned to receive and not bend the staples on the top lamination.

After securing the top two laminations together, fourth station 78 rotates in a third direction 92 about axis 18. For example, fourth station 78 can rotate about sixty degrees (60°) in a clockwise direction. Thus, fourth station 78 can rotate stator core 26 in the forth station into position to receive the next lamination.

In the illustrated embodiment, termination lamination 52 is illustrated positioned in fourth station 78. Again, termination lamination 52 lacks staples. Thus, lamination 28 can be indexed into fourth station 78 over termination lamination 52 without being stapled thereto. In this manner, method 60 allows multiple stator cores 26 to be formed, one on top of another, in fourth station 78.

Die 66 can include one or more suspension members 94. Members 94 are configured to support blank 62 above die 66 as it is moved among the stations in first direction 68. In addition, members 94 are configured to retract into die 66 as press 64 is moved in direction 70 and, thus, the members allow blank 62 to be stamped by the action of the press and the die. For example, members 94 can be spring biased from die 66.

Advantageously, members 94 suspend blank 62 above die 66 during movement in first direction 68. Suspension of blank 62 over die 66 reduces the area of contact between the blank and the die and, thus, can reduce the friction between these components. In addition, suspension of blank 62 over die 66 can ensure that the blank does not impinge on lances 84 extending from the die.

It should be recognized that system 30 is described above by way of example as having a pair of staples, a pair of holes, and a pair of openings in each lamination 28. In addition, system 30 is described above by way of example as having the staples, holes, and openings offset from one another by about sixty degrees. Of course, it is contemplated by the present disclosure for rotated reverse-direction-staple system 30 to have more or less than two staples, holes, and openings in each lamination and/or for these components to be evenly and/or unevenly offset from one another by more or less than sixty degrees.

For example, it is contemplated for rotated reverse-direction-staple system 30 and method 60 to include three staples, holes, and openings in each lamination. Here, the three staples 32 can be evenly spaced from one another about the circumference of the lamination. Similarly, the three holes and openings are also evenly spaced from one another, respectively, about the circumference of the laminations.

Figure 5:
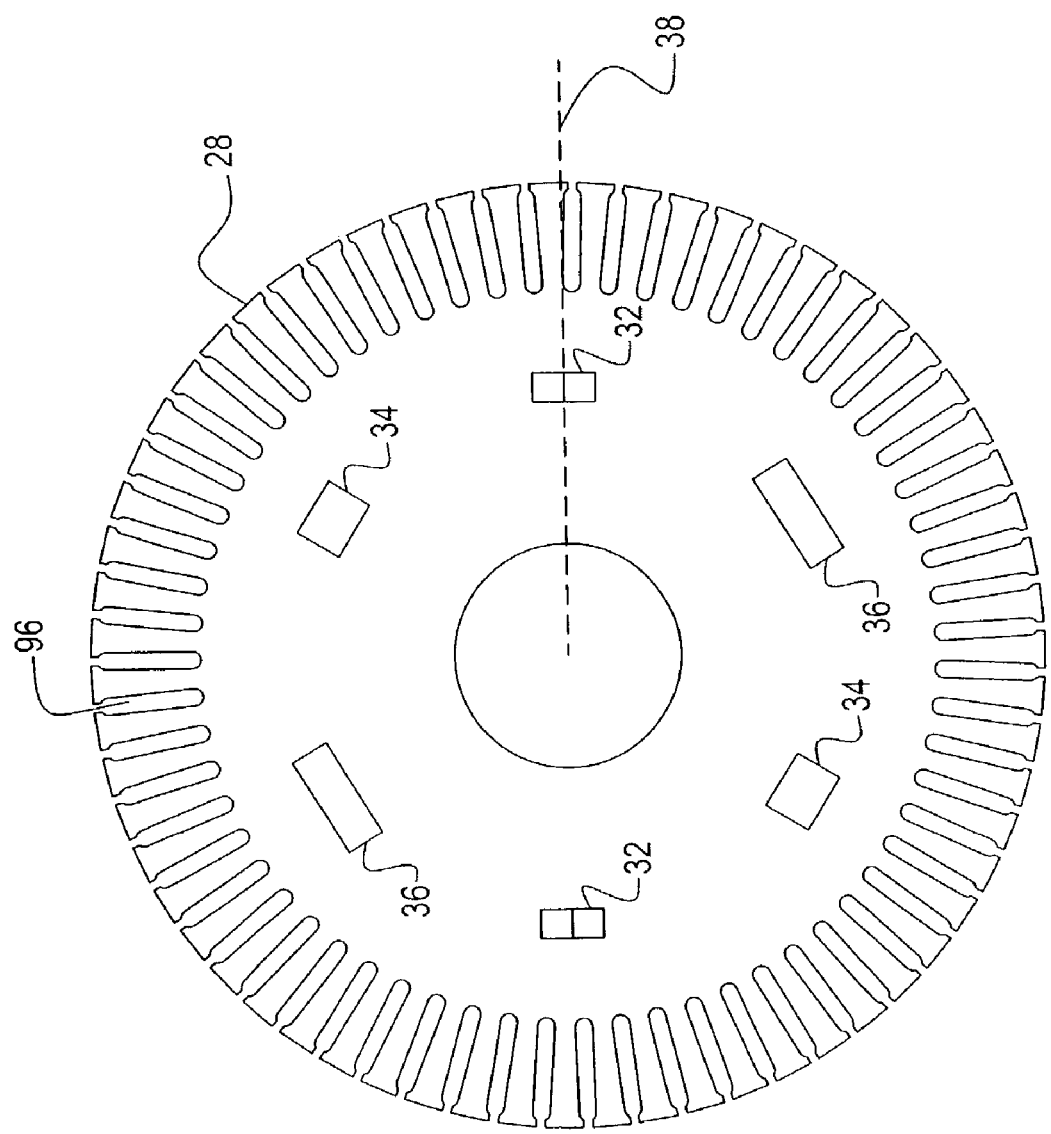
FIG. 5 is a top view of an alternate exemplary embodiment of a lamination for a rotated reverse-direction-staple system according to the present disclosure.

An alternate exemplary embodiment of rotated reverse-direction-staple system 30 is illustrated in FIG. 5. Here, system 30 is illustrated with respect to a lamination 28 for rotor core 24. Again, lamination 28 includes staples 32, staple access holes 34, and staple clearance openings 36. In this embodiment of system 30, lamination 28 is configured to form rotor core 24 having winding slots 96 offset from one another to form helical pattern as best seen in FIG. 1. In this example, system 30 includes staples 32, holes 34, and openings 36 that are unevenly offset from one another to achieve the desired helical pattern of slots 96.

Specifically, staples 32, holes 34, and openings 36 are sized, positioned, and configured so that rotation of the laminations 28 with respect to one another about axis 20 in third direction 92 results in winding slots 96 that are offset from one another by a predetermined skew angle from lamination to lamination. The predetermined skew angle is sufficient to provide rotor core 24 with winding slots 96 having the desired helical pattern.

As seen in FIG. 5, lamination 28 includes one staple 32 positioned at about zero degrees (0°) from datum line 38, while the other staple 32 is positioned at about one hundred seventy three degrees (173°) from the datum line. In addition, lamination includes one hole 34 positioned at about one hundred nineteen degrees (119°) from datum line 38, while the other hole 34 is positioned at about two hundred ninety four degrees (294°) from the datum line. Further, lamination 28 includes one opening 36 positioned at about fifty degrees (50°) from datum line 38, while the other opening 36 is positioned at about two hundred thirty eight degrees (238°) from the datum line.

During assembly, subsequent laminations 28 are rotated with respect to one another by about sixty degrees (60°). An example of system 30 having four laminations 28, namely first lamination 40, second lamination 42, third lamination 44, and fourth lamination 46, rotated with respect to one another by about sixty degrees (60°) is illustrated in FIG. 6. Here, the position of each staple 32, hole 34, and opening 36 is illustrated in degrees from datum line 38.

The predetermined skew angle is the angular difference between staple 32 of first lamination 40 and its corresponding hole 34 in second lamination. In this example, the predetermined skew angle is about six degrees (6°) and, thus provides winding slots 96 offset from one another to form the desired helical pattern. Of course, it is contemplated by the present disclosure for system 30 to have larger or smaller skew angles.

It should be noted that system 30 is described herein by way of example forming stator core 26 having axially aligned winding slots and rotor core 24 having helically positioned winding slots for purposes of clarity. Of course, it is contemplated by the present disclosure for system 30 to provide helical stator cores and/or straight rotor cores.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

The invention claimed is:

1. A core for an electric machine, comprising:
   a first lamination plate having a first staple extending therefrom;
   a second lamination plate having a second staple extending therefrom and a second hole defined therein, said second lamination plate secured on said first lamination plate by said first staple being received through said second hole and having a first portion bent over said second lamination plate;
   a third lamination plate having a third hole defined therein and a third opening defined therein, said third lamination plate secured on said second lamination plate by said second staple being received through said third hole and having a second portion bent over said third lamination plate, and said first portion of said first staple being received in said third opening.

2. The core as in claim 1, wherein said third lamination plate is a terminating lamination plate.

3. The core as in claim 1, wherein said first, second, and third lamination plates are stamped from a common blank.

4. The core as in claim 3, wherein said first and second lamination plates are rotated with respect to one another about an axis defined through said core.

5. The core as in claim 4, wherein said second and third lamination plates are rotated with respect to one another about said axis.

6. The core as in claim 5, wherein said core is a rotor core or a stator core.

7. The core as in claim 1, wherein said first, second, and third lamination plates each include a plurality of winding slots defined therein, said first, second, and third lamination plates being secured to one another so that said plurality of winding slots are axially aligned with respect to one another or are offset from one another.

8. A core for an electric machine comprising:
a first lamination plate having a first staple;
a second lamination plate having a second staple and a second hole; and
a third lamination plate having a third hole and a third opening, said first and second lamination plates being rotated with respect to one another so that said first staple is positioned through said second hole and is bent over said second lamination plate to secure said first and second lamination plates to one another, and said second and third lamination plates being rotated with respect to one another so that said second staple is positioned through said third hole and is bent over said third lamination plate to secure said second and third lamination plates to one another and such that said first staple that is bent over said second lamination plate is received in said third opening.

9. The core as in claim 8, wherein said first staple and said second staple extend in an upward direction from said first and second lamination plates, respectively.

10. The core as in claim 8, wherein said core is a rotor core or a stator core.

11. The core as in claim 8, wherein said first, second, and third lamination plates each include a plurality of winding slots defined therein.

12. The core as in claim 11, wherein said first, second, and third lamination plates are secured to one another so that said plurality of winding slots are axially aligned with respect to one another.

13. The core as in claim 11, wherein said first, second, and third lamination plates are secured to one another so that said plurality of winding slots are offset from one another by a predetermined skew angle.

* * * * *